Aug. 1, 1961    G. F. LUBBEN ET AL    2,994,495
ROTOR ISOLATION AND AIR SUPPLY MECHANISM FOR A HELICOPTER
Filed Dec. 10, 1959    2 Sheets-Sheet 1
FIG. 1
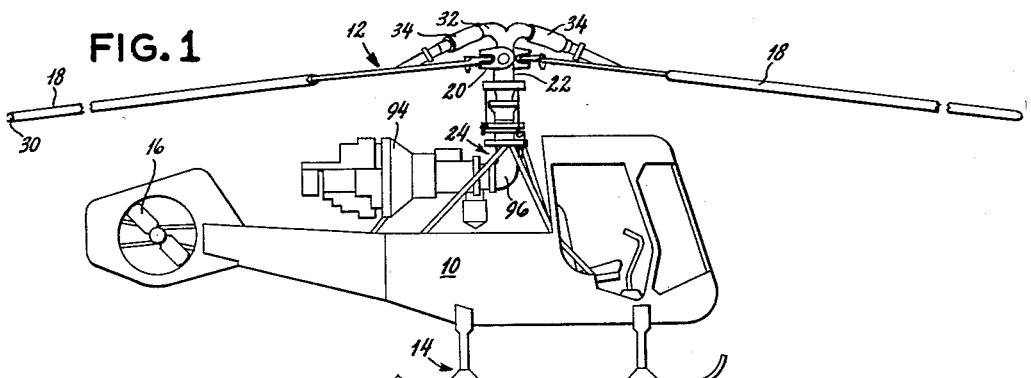
FIG. 2
FIG. 3
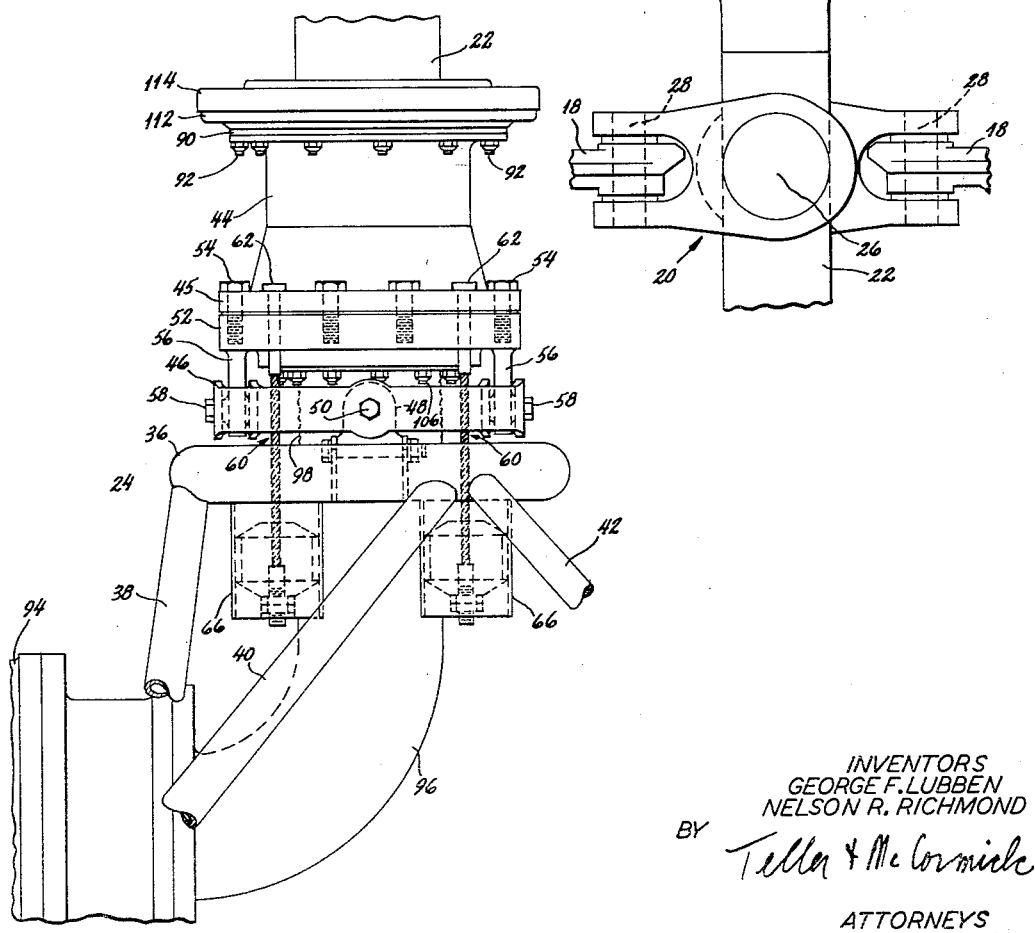
INVENTORS
GEORGE F. LUBBEN
NELSON R. RICHMOND
BY
ATTORNEYS Aug. 1, 1961  G. F. LUBBEN ET AL  2,994,495
ROTOR ISOLATION AND AIR SUPPLY MECHANISM FOR A HELICOPTER
Filed Dec. 10, 1959  2 Sheets-Sheet 2

INVENTORS
GEORGE F. LUBBEN
NELSON R. RICHMOND
BY
Teller & McCormick
ATTORNEYS

United States Patent Office 2,994,495
Patented Aug. 1, 1961

2,994,495
ROTOR ISOLATION AND AIR SUPPLY MECHANISM FOR A HELICOPTER
George F. Lubben, Simsbury, and Nelson R. Richmond, Thompsonville, Conn., assignors to The Kaman Aircraft Corporation, Bloomfield, Conn., a corporation of Connecticut
Filed Dec. 10, 1959, Ser. No. 858,678
6 Claims. (Cl. 244—17.27)

The invention relates to a helicopter and more particularly to connections between the fuselage and the main rotor shaft.

One object of the invention is to provide an advantageous mechanical connection between the fuselage and a bearing member for the main shaft, which connection is constructed and arranged to permit angular adjustment of said bearing member and shaft relative to said fuselage.

Another object of the invention is to provide an advantageous air connection between a compressor in the fuselage and a hollow main rotor shaft, the shaft being suitably connected with means for conducting air to reaction jet nozzles on the rotor blades.

The drawings show a preferred embodiment of the invention and such embodiment will be described, but it will be understood that various changes may be made from the construction disclosed, and that the drawings and description are not to be contrued as defining or limiting the scope of the invention, the claims forming a part of this specification being relied upon for that purpose.

Of the drawings:

FIG. 1 is a side view of a helicopter embodying the invention.

FIG. 2 is an enlarged side view of the upper portion of the main shaft and of certain associated parts.

FIG. 3 is an enlarged side view of the lower portion of the main shaft and of the means for connecting it with the fuselage.

Figure 4:
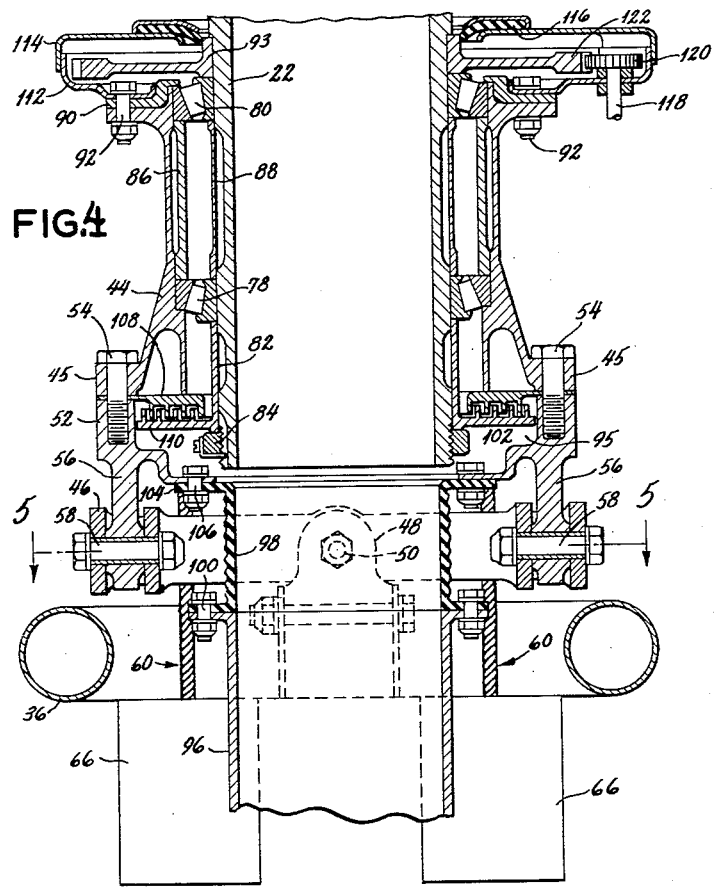
FIG. 4 is a vertical sectional view taken along the line 4—4 of FIG. 2.

Referring to the drawings, and more particularly FIG. 1 thereof, 10 represents the fuselage of a helicopter embodying the invention, 12 represents the rotor, 14 represents the landing gear, and 16 represents the tail rotor. These parts can be widely varied and they do not of themselves constitute any part of the invention.

The rotor 12 of the helicopter comprises a plurality of generally radial blades 18, 18 connected with a hub 20 and uniformly spaced about a central vertical axis. The hub 20 is connected with a vertical main shaft 22 extending upwardly from a pylon structure 24 on the fuselage 10. The rotor is shown as having two blades, but the invention is not necessarily so limited. As shown in FIG. 2, the hub 20 is connected with the shaft 22 for pivotal movement about a teeter axis at 26. The blades 18, 18 are connected with the hub 20 for pivotal movements about lead-lag axes at 28, 28. The details of the rotor and more particularly the blades thereof may be the same as those disclosed in the pending Lubben, Schauble and McCoubrey application Serial No. 850,953 filed November 4, 1959, and entitled Helicopter Rotor and Method of Making a Blade Member Thereof.

The rotor 12 is shown as being jet driven by means of compressed air supplied from the fuselage. Each blade includes a hollow spar member providing a radial air duct which communicates at its outer end with a reaction jet nozzle, one nozzle being shown at 30. The main shaft 12 is hollow and air under pressure is supplied thereto as hereinafter explained in detail. The hollow shaft 22 is connected at its upper end with a bifurcated member 32 and with flexible tubes 34, 34, said tubes being connected with the inner ends of the ducts in the blades. The flexible tubes 34, 34 permit all normal movements of the blades relatively to the shaft.

The pylon structure 24 preferably comprises a large tubular ring 36 which is concentric with the axis of the shaft 22, and said ring is fixedly connected with the fuselage by suitable struts such as 38, 30 and 42. Supported on the pylon structure, and specifically on the ring 36 thereof, is a main bearing member 44 which surrounds the shaft 22 and is provided with bearings therefor as hereinafter described in detail. The member 44 is shown as having an annular flange 45 thereon. The bearing member 44 is connected to and supported by the ring 36 by a suitable isolation means which permits angular adjustment of said member and said shaft in any direction.

Preferably the supporting and isolation means for the bearing member includes a gimbal ring 46. The gimbal ring 46 is connected to the tubular ring 36 for movement about a horizontal axis intersecting the vertical axis of the main shaft and the bearing member 44 is connected to the gimbal ring 46 for movement about a horizontal axis which also intersects said vertical axis and which is perpendicular to the first said horizontal axis. By reason of the described mounting, the bearing member 44 and the shaft 22 are pivotally movable in any direction, subject however to the action of restraining and controlling means as hereinafter described.

Preferably, the gimbal ring 46 has four equally spaced apertures therein, which apertures extend from the top and bottom faces of the ring and which apertures are closed sided. Two oppositely disposed brackets 48, 48 are fixedly connected to the tubular ring 36 and arms constituting portions of these brackets extend upwardly into two opposite apertures in the gimbal ring 46. Horizontal pivot pins 50, 50 connect the gimbal ring 46 with said brackets 48, 48 and these pins provide the first said horizontal axis. The bearing member 44 rests upon a carrier ring 52 to which it is secured by studs 54, 54 extending through holes in the flange 45. Two oppositely disposed arms 56, 56 extend downwardly from the ring 52 and enter the remaining two apertures in the gimbal ring 46. Horizontal pivot pins 58, 58 connect the gimbal ring 46 with said arms 56, 56 and provide the second said horizontal axis. The first said horizontal axis at the pins 50, 50 is shown as extending transversely of the fuselage and the second horizontal axis at the pins 58, 58 is shown as extending longitudinally of the fuselage, but these positions of the axes are not essential.

As before stated, the bearing member 48 and the shaft 22 are pivotally movable in any direction and they are so movable about one or the other or both of the horizontal gimbal axes, suitable means being provided for restraining and controlling such pivotal movements. Preferably, the last said means comprises four restraining and controlling devices 60, 60 equally spaced circumaxially. Each of the devices 60, 60 includes a resilient element connected with the fuselage and a substantially vertical tension member between said resilient element and said bearing member. As shown, each restraining and controlling device comprises a vertical tension member 61 extending downwardly from the bearing member 44 and connected at its lower end with a yieldable element carried by the fuselage, preferably by means of the tubular ring 36.

Figure 6:
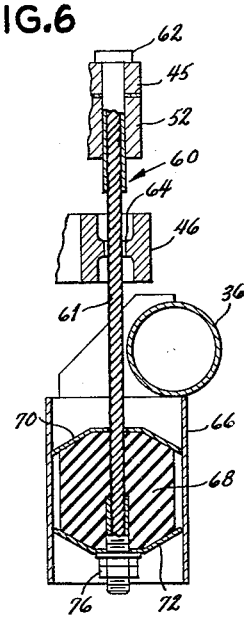
FIG. 6 is a vertcial sectional view taken along the line 6—6 of FIG. 5.
Figure 5:
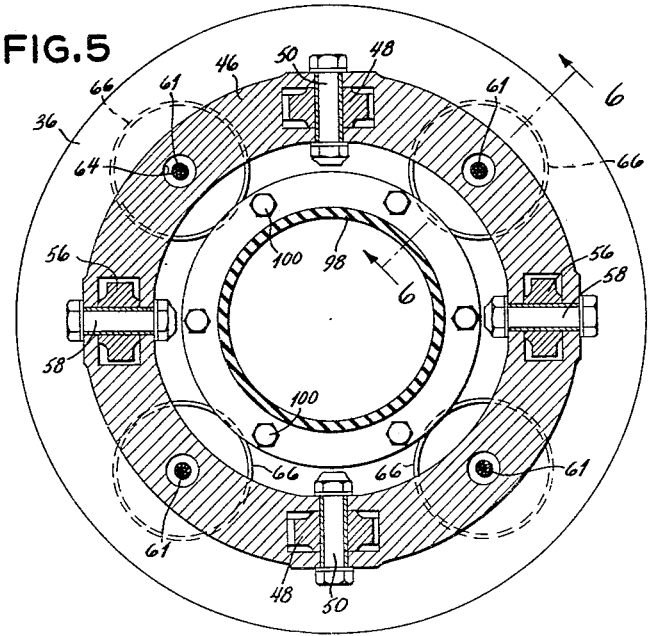
FIG. 5 is a horizontal sectional view taken along the line 5—5 of FIG. 5.

One of the restraining and controlling devices 60 is best shown in FIG. 6. The vertical tension member 61 is shown as being a metallic cable and said cable is entered at its upper end in aligned holes in the carrier ring 52 and in the flange 45 of the member 44 and is suitably secured in place. Preferably, the upper portion of the cable 61 is held within a headed tube 62 by soldering or otherwise, and the tube is entered in the holes in the ring 52 and in the flange 45 with the head of the tube engaging the top of the flange. The cable 61 extends through a hole 64 in the gimbal ring 46. The lower end of the cable 61 extends into a vertical cylindrical member 66 which is fixedly connected with the tubular ring 36. The axis of the cylindrical member is coincident with the axis of the cable. Located within the member 66 is a cylindrical body or element 68 of rubber or equivalent elastic material which is centrally apertured for the cable. An upper diaphragm 70 is secured to the wall of the cylindrical member 66 and prevents upward movement of the element 68. A lower diaphragm 72 engages the bottom of the element 68 and is vertically movable. The cable 61 is connected with the lower diaphragm. Preferably, the lower portion of the cable is held within an exteriorly threaded tube by soldering or otherwise, and adjustable nuts 76 on the tube engage the diaphragm 72. Tension in the tension members or cables can be adjusted by turning the nuts.

From the foregoing description it will be apparent that the gimbal ring and its associated parts permit angular adjustment of said bearing member and shaft relative to said fuselage, and more particularly angular adjustment about one or the other or both of said first and second horizontal axes. Each of the devices 60, 60 serves to apply downward pressure to its connected portion of the bearing member 44 and to permit upward movement thereof in opposition to the action of the asosciated resilient element 68. The devices 60, 60 collectively constitute means for restraining and controlling said angular adjustment.

Interposed between the bearing member 44 and the shaft 22 are two vertically spaced roller bearings 78 and 80 each adapted to carry vertical thrust. The outer race of the lower bearing 78 engages a shoulder on the member 44. A spacing sleeve 82 is interposed between the inner race of the bearing 78 and a collar 84 secured to the shaft. A spacing sleeve 86 is interposed between the outer races of the two bearings 78 and 80 and a spacing sleeve 88 is interposed between the inner races of said two bearings. The outer race of the upper bearing 80 is held against relative upward movement by an annular member 90 connected to the bearing member 44 by bolts 92, 92. The inner race of the upper bearing is held against relative upward movement by a member 93 secured to the shaft.

The upward thrust resulting from the lift of the rotating rotor is transmitted from the collar 84 on the shaft, through the sleeve 82, through the bearing 78, through the sleeve 86, and through the outer race of the bearing 80 to the member 90. The downward thrust resulting from the weight of the shaft and rotor, when idle, is transmitted through the member 93, through the bearing 80, through the sleeve 86 and through the outer race of the bearing 78 to the shoulder on the member 44.

It has been stated that air under pressure is transmitted through the hollow shaft 22, through the member 32, through the flexible tubes 34, 34 and through ducts in the blades to jet nozzle 30 at the tips of the blades. The required air under pressure is initially transmitted from a compressor 94 in the fuselage to an air chamber 95 surrounding the lower portion of the shaft 22, said chamber being defined by nonrotating walls carried by the bearing member 44 and the carrier ring 52. The chamber 95 communicates with the lower end of the hollow shaft and the chamber has a large bottom opening.

The said air chamber 95 is defined in part by the main annular portion of the carrier ring 52 and by an inwardly extending flange 102 integral with the ring. The flange 102 defines the said large bottom opening in the chamber. Air is conducted from the compressor to said chamber 95 through a rigid elbow duct 96 and through a flexible duct 98. Annular flanges are provided on the adjacent ends of the ducts 96 and 98 and these flanges are connected with each other by bolts 100. The upper end of the flexible duct 98 is provided with an annular flange 104 engaging the flange 102. The last said flanges are connected by bolts 106. Thus the flexible duct 98 is connected with the air chamber 95 at said bottom opening therein. The flange or chamber wall 102 is carried by the ring 52 and it therefore moves in accordance with any angular adjustments of the bearing member and shaft. The duct 98 yields in accordance with said angular adjustments.

A seal in the form of a labyrinth is provided to minimize the escape of air from the chamber 95 and between the nonrotating ring 52 and the rotating shaft 22. As shown, a nonrotating labyrinth member 108 is provided at the upper portion of the chamber 95, this member being within the carrier ring 52 and surrounding the shaft 22, said member 108 having a plurality of concentric annular depending ribs. As shown, the member 108 has a flat annular flange which is engaged between the ring 52 and the flange 45 of the member 44. A rotating labyrinth member 110 is provided below and closely adjacent the member 108, this member having a plurality of concentric annular ribs which extend upwardly between the depending ribs on the member 108. As shown, the rotating member 110 is integral with the spacing sleeve 102. The annular ribs on the two members 108 and 110 are as proportioned and so spaced as to avoid engagement with each other, and they provide a restricted air passageway. Air can escape from the chamber 95, otherwise than through the shaft, only by passing generally inwardly through said restricted passageway. The resistance to such flow is such that very little air escapes.

The air that passes through the labyrinth device 108, 110 is discharged into the space within the bearing member 44. The last said space is at least partly closed at the top by two associated members 112 and 114, said member 112 being held by the same bolts 92, 92 that hold the member 90. A flexible seal 116 is provided between the member 114 and the member 93 secured to the shaft 22. This seal prevents the entry of dust and the like into the bearing spaces, and it further resists the escape of any air that has passed through the labyrinth 108, 110. The entire space within the member 44 and within the members 112 and 114 is closed except at the top, and the seal 116 tends to prevent escape of air at the top.

Preferably, a power take-off shaft 118 is provided. A gear 120 on this shaft meshes with a gear 122 driven by th shaft 22. As shown, the before mentioned member 92 constitutes the hub 122. The members 112 and 114 constitute a housing for the gears 120 and 122 and constitute a support for the take-off shaft 118. The shaft 118 serves to drive one or more small accessories, and the shaft is rotated when the rotor is being normally rotated by the jets and also when, for any reason, the rotor is in autorotation.

The invention claimed is:

1. The combination in a helicopter, of a fuselage, a vertical rotatable shaft, a multiple blade rotor connected to the shaft for rotation therewith, a bearing member surrounding the lower portion of the shaft, bearings between the last said member and the rotatable shaft for holding said shaft in fixed relation to said member, a generally horizontal gimbal ring concentric with the shaft, means for connecting the gimbal ring with the fuselage for pivotal movement about a first horizontal axis intersecting the shaft axis, means for connecting the bearing member with the gimbal ring for pivotal movement about a second horizontal axis intersecting the shaft axis, and four similar restraining and controlling devices equally spaced circumaxially and each including a resilient element connected with the fuselage and a substantially vertical tension member between said resilient element and said bearing member, each of said devicecs serving to apply downward pressure to its connected portion of the bearing member and to permit upward movement thereof in opposition to the action of the associated resilient element.

2. The combination in a helicopter, of a fuselage, a vertical rotatable shaft, a multiple blade rotor connected to the shaft for rotation therewith, a bearing member surrounding the lower portion of the shaft, bearings between the last said member and the rotatable shaft for holding said shaft in fixed relation to said member, a generally horizontal gimbal ring concentric with the shaft and having four equally spaced closed-sided apertures therein, arms extending upwardly from the fuselage into opposite apertures in the gimbal ring, horizontal pivot pins for connecting the ring with said arms to provide a first horizontal axis intersecting the shaft axis, arms extending downwardly from the bearing member into the remaining apertures in the gimbal ring, horizontal pivot pins for connecting the ring with the last said arms to provide a second horizontal axis intersecting the shaft axis, and four similar devices equally spaced circumaxially and each including a resilient element connected with the fuselage and a substantially vertical tension member between said resilient element and said bearing member, each of said devices serving to apply downward pressure to its connected portion of the bearing member and to permit upward movement thereof in opposition to the action of the associated resilient element.

3. The combination in a helicopter, of a fuselage, a vertical rotatable shaft, a multiple blade rotor connected to the shaft for rotation therewith, a bearing member surrounding the lower portion of the shaft, bearings between the last said member and the rotatable shaft for holding said shaft in fixed relation to said member, a horizontal supporting ring in fixed position on the fuselage and concentric with the shaft, a generally horizontal gimbal ring concentric with the shaft and located above the supporting ring, means connecting the gimbal ring with the supporting ring for pivotal movement about a first horizontal axis intersecting the shaft axis, means connecting the bearing member with the gimbal ring for pivotal movement about a second horizontal axis intersecting the shaft axis and perpendicular to the first horizontal axis, and four similar devices equally spaced circumaxially and each including a resilient element carried by the supporting ring and a substantially vertical tension member between said resilient element and said bearing member, each of said devices serving to apply downward pressure to its connected portion of the bearing member and to permit upward movement thereof in opposition to the action of the associated resilient element.

4. The combination in a helicopter, of a fuselage, a vertical hollow rotatable shaft, a multiple blade rotor connected to the shaft for rotation therewith, a bearing member surrounding the lower portion of the shaft, bearings in the space between the last said member and the rotatable shaft for holding said shaft in fixed relation to said member, means below the bearing member for connecting said member with the fuselage which means is constructed and arranged to permit angular adjustment of said bearing member and shaft relative to said fuselage, means for restraining and controlling said angular adjustment, walls in fixed relation to said angularly adjustable bearing member for defining an air chamber surrounding the lower portion of the shaft and having a bottom opening in register with the opening in the hollow shaft, an air compressor in fixed position on the fuselage, a duct connected to receive air from said compressor and having its discharge end located below the shaft and connected with said chamber walls at said opening therein for delivering air to said chamber, said duct having a flexible section adjacent its discharge end for accommodating relative movement of said chamber walls in accordance with angular adjustment of said bearing member and shaft, a labyrinth device for retarding the escape of air from said chamber otherwise than through the hollow shaft which device includes two closely adjacent members carried respectively by said rotatable shaft and by said nonrotatable bearing member, reaction jet nozzles on the rotor blades, and means connected with the upper end of the hollow shaft for conducting air from said shaft to said nozzles.

5. A helicopter as set forth in claim 4, wherein the means for connecting the bearing member with the fuselage includes a generally horizontal gimbal ring concentric with the shaft and includes means for connecting the gimbal ring with the fuselage for pivotal movement about a first horizontal axis intersecting the shaft axis and further includes means for connecting the bearing member with the gimbal ring for pivotal movement about a second horizontal axis intersecting the shaft axis, and wherein the flexible duct section for delivering air to the air chamber extends through said gimbal ring.

6. A helicopter as set forth in claim 4, wherein the parts are so constructed that air escaping through the labyrinth device is discharged into the space within the bearing member, which space is otherwise closed except at the top, and wherein a seal is provided at the top of the last said space for retarding the escape of air therefrom.

References Cited in the file of this patent

UNITED STATES PATENTS

| | | |
|---|---|---|
| 2,644,533 | Maillard | July 7, 1953 |
| 2,795,110 | Chamberlin | June 11, 1957 |
| 2,818,223 | Doblhoff | Dec. 31, 1957 |